United States Patent [19]
Burgess

[11] Patent Number: 5,381,337
[45] Date of Patent: Jan. 10, 1995

[54] NO SKID BRAKE CONTROL

[75] Inventor: James Q. Burgess, Dayton, Ohio

[73] Assignee: Systems Research Laboratories, Inc., Dayton, Ohio

[21] Appl. No.: 102,883

[22] Filed: Aug. 6, 1993

[51] Int. Cl.6 .......................... B60T 8/32; B60K 28/16
[52] U.S. Cl. .......................... 364/426.02; 364/426.01; 303/93; 303/112
[58] Field of Search ............. 364/426.02, 426.01, 364/558; 180/197; 303/93, 97, 100, 112, 104; 73/862.12, 862.08, 862.23

[56] References Cited

U.S. PATENT DOCUMENTS

| | | | |
|---|---|---|---|
| 4,336,592 | 6/1982 | Beck | 364/426.02 |
| 4,412,291 | 10/1983 | Amberg et al. | 364/426 |
| 4,550,372 | 10/1985 | Kahrs | 364/426.01 |
| 4,733,760 | 3/1988 | Inagaki et al. | 192/1.22 |
| 4,750,124 | 7/1988 | Lin et al. | 364/426 |
| 4,790,606 | 12/1988 | Reinecke | 303/103 |
| 4,794,538 | 12/1988 | Cao et al. | 364/426.02 |
| 4,822,113 | 4/1989 | Amberg | 303/100 |
| 4,862,368 | 8/1989 | Kost et al. | 364/426.02 |
| 4,971,164 | 11/1990 | Fumita et al. | 180/197 |
| 5,050,940 | 9/1991 | Bedford et al. | 303/100 |
| 5,070,459 | 12/1992 | Van Zanten et al. | 364/426.02 |
| 5,070,460 | 12/1991 | Yasuno | 364/426.02 |
| 5,116,108 | 5/1992 | Sigl | 303/103 |
| 5,135,290 | 8/1992 | Cao | 363/100 |
| 5,244,258 | 9/1983 | Van Zanten et al. | |

FOREIGN PATENT DOCUMENTS

2829207 1/1979 Germany.
90/11213 10/1990 WIPO.

Primary Examiner—Kevin J. Teska
Assistant Examiner—Tan Nguyen
Attorney, Agent, or Firm—Biebel & French

[57] ABSTRACT

The present invention is a brake control system for preventing the skidding of a wheel on a surface. The phase relationship between the brake pressure applied to the brakes and the torque created from the braking applied is determined. This relationship allows the present brake control system to maintain the wheels from skidding on a surface by maintaining a positive slope of such brake pressure and torque phase relationship. A second embodiment provides a backup system wherein the percentage of slip is determined and compared to an input percentage slip. The second embodiment system overrides the torque command system when the torque command system fails.

17 Claims, 7 Drawing Sheets

NO SKID BRAKE CONTROL

BACKGROUND OF THE INVENTION

The present invention relates to the controlling of a vehicle's brakes to prevent the lock-up or skidding of a wheel against a surface. Skidding is defined as slippage in 100% of the tire/roadway interface. More specifically, the present invention relates to a brake control which utilizes the phase relationship between the brake pressure and the torque created from applying the brakes to prevent the skidding of the wheel.

There have been several attempts to control the skidding of a wheel. These attempts have been limited in that the skidding of a wheel must begin before the inducement of the anti-skid brake control. Therefore, there has not been established a means of controlling the brakes of a vehicle to prevent completely the skidding of a wheel.

One attempt to provide anti-skid brake control has been to utilize the speed of a wheel in relation to the speed of the ground. As stated above, this type of anti-skid brake control is not activated until the speed of the ground versus the speed of the wheel changes. Thus, the wheel begins to skid before the anti-skid brake control modulates the brakes. This method does prevent the actual lock-up of the wheel which causes a full skid, but does not prevent incipient skidding of the wheel on the surface.

Another attempt to provide an anti-skid control system for brakes utilizes the brake pressure and brake torque to vary the gain of the existing anti-skid system. This system uses an accelerometer to measure the brake torque combined with a pressure signal in a summing circuit to modify the control signal to limit the skidding of the wheel on the surface. Again, this system did not provide a true anti-skid control which prevents the skidding of the wheel.

Yet another attempt has been to utilize incremental changes in speed and torque to prevent the skidding of the wheel. This attempt has been to limit both the driving torque and the braking torque in order to control the skidding. The instantaneous frictional coefficient of the wheel is estimated from the wheel speed and torque signals to limit the skidding of the wheel.

Yet still another attempt has been to measure the brake pressure and torque developed by the brake pressure to limit the brake pressure thereby limiting the braking torque to prevent mechanical damage to the landing gear of an aircraft or of a vehicle. This system does not limit the skidding of the wheel but prevents excessive torque being applied to the wheel which may cause damage to the wheel.

Thus, it is desired to provide a control system for controlling the brake system of a vehicle that would prevent any skidding of the wheel on a surface. Such a system would prevent the skidding of the wheel on a surface having varying characteristics such as a mixture of ice or snow and dry spots. The system would have a quick response time in order to control the brakes under varying conditions to prevent any skidding of the wheel on the surface. Such a system would have to anticipate the beginning of a skid and prevent such skidding by modifying the brake control accordingly.

SUMMARY OF THE INVENTION

The present invention operates upon the calculation of the relationship between the brake pressure applied to the brake and the torque developed from the brake. This invention takes advantage of the coefficient of torque-slip curve. The coefficient of torque is determined in the present invention by measuring the applied force, in this case the brake pressure, and the force resisting, in this case the torque developed by applying the brakes. Therefore, by measuring and determining the phase relationship between the incremental brake pressure and the incremental torque created, one can maintain optimum braking and avoid skidding because the ratio of the increments changes from (+) to (−).

Figure 1:
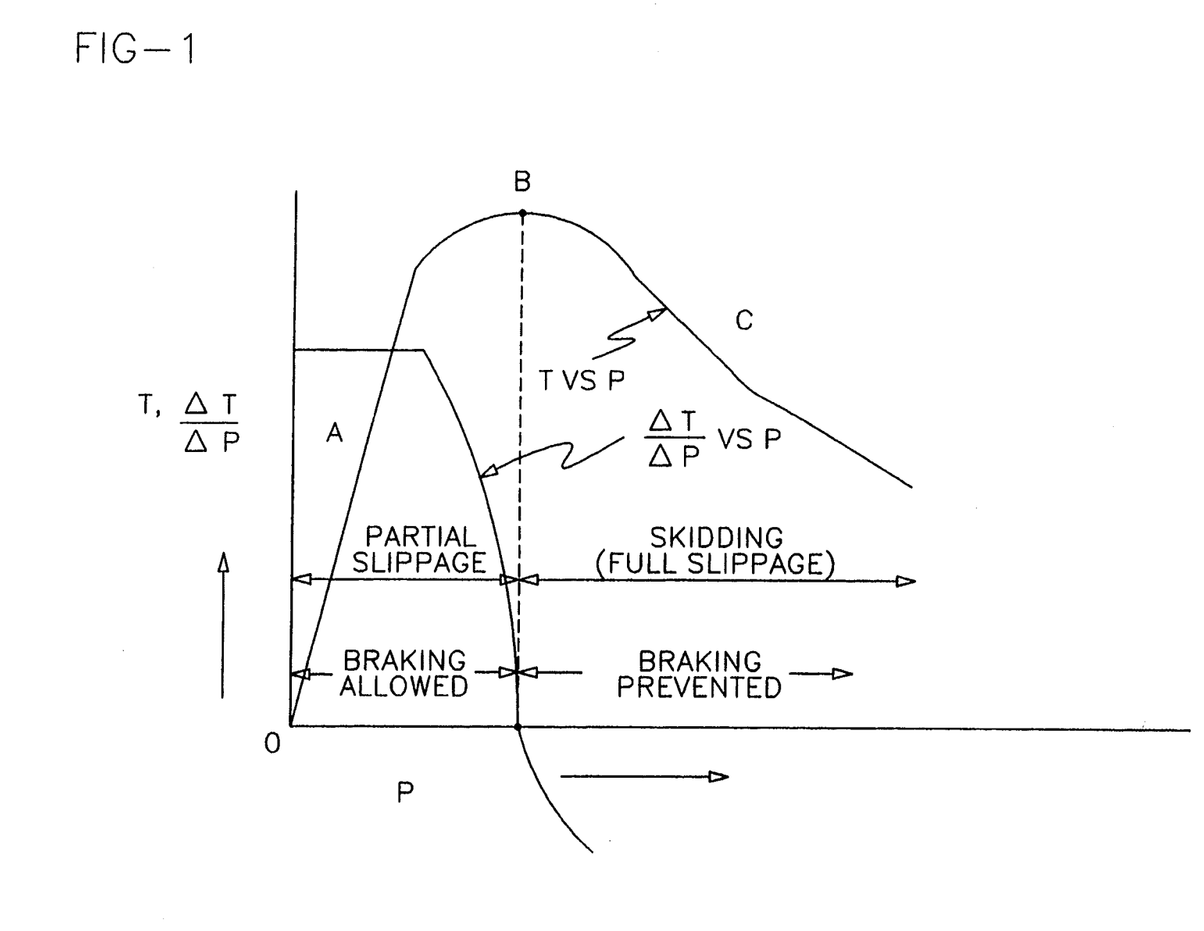
FIG. 1 is a graph of the general relationship between the brake pressure and the brake torque plus a second graph of the ratio of incremental torque to incremental pressure versus the brake pressure.

Referring to FIG. 1, the relationship between the torque and brake pressure is shown. The phase relationship has a positive slope A when the brake pressure is such that the torque created is less than the torque which begins the skidding of a wheel. Once the slope of this phase relationship turns zero, at B, the following resulting actions will occur each depend on the type of brake system. In the brake system of the present invention the brake pressure will be reduced before the wheel slows which will return the slope to the (+) or (0) condition.

In a manual human-controlled brake system, the operator closes a loop for deceleration so normally the brake pedal is pressed according to the desired deceleration but as the slope of the relationship turns zero and deceleration drops the first reaction is to press the brake pedal even harder. How quickly the operator adapts is related to experience and skill, but typical reaction times are about ¾ second.

In a straight torque-controlled servo-loop brake system when the slope of this relationship turns zero the phase of the feedback suddenly switches from (−) stable to (+) unstable and applies maximum brake pressure. The torque may appear momentarily higher as the kinetic energy of the spinning wheel is absorbed by the brake, but it drops rapidly as all the heat developed in sliding friction is generated at one spot on the tire.

In a speed-sensing anti-skid brake system (both operator and computer controlled systems) when the slope of this relationship turns zero the wheel begins to skid, but nothing is done until the speed drops to some fraction of a reference speed or until the angular deceleration exceeds some limit. At this point the pressure is reduced and the wheel speed recovers. Some of these systems during a stop may show several cycles of skid and spinup. They are evident on a roadway by the periodic black skid marks. They may be faster than a human operator, but they waste time.

The present invention measures both the brake pressure and the torque and calculates their phase relationship. The slope of this relationship is then used to limit the brake pressure being applied to the brakes to ensure that the slope of this phase relationship is excluded from negative values. Excluding negative values from the phase relationship between the brake pressure and the torque ensures the optimum performance of the brake. By restricting the brake control from areas where the slope is negative, wheel skids can be completely prevented even when the coefficient of friction is varying.

The phase relationship of the brake pressure and the torque is calculated by the present invention by measuring the torque and brake pressure, differentiating the torque with respect to the brake pressure, and determining the slope of their phase relationship. This slope is then used to determine if braking pressure should be limited to prevent skidding of the wheel on the surface.

In another embodiment of the present invention an additional system is added wherein the wheel speed and the ground speed are measured to determine the percentage of the wheel slip. This system is a secondary system which is used if the torque command system fails. The percentage of slippage of the wheel is determined and compared to an inputted slip command. This input slip command is an operator input which determines what percentage of slip is desirable. If the actual measured percentage slip exceeds the inputted slip command and the torque command system fails, then the slip command system will control the brake system.

It should be understood that both the systems are closed loop systems which control the brake system only when the wheel approaches a skid or begins to skid against the surface. Under normal operations, the circuitry will continually monitor and measure the performance of the brake system but will not modify the applying of the brakes unless the wheel approaches a skid or actually enters into a skid.

It is an object of the present invention to control a brake system to prevent skidding of a wheel associated with the brake system of a vehicle by producing a brake pressure signal representing braking pressure being applied to the brakes; measuring a torque developed on the wheel from the brakes being applied to the wheel and producing a brake torque signal representing the torque; determining a phase relationship between the brake pressure signal and the torque signal; calculating a slope of the phase relationship, and maintaining the brake pressure such that the slope of the phase relationship of the brake pressure signal and the brake torque is prevented from going negative.

Thus, it is an object of the present invention to provide a no-skid brake system wherein the skidding of the wheel on a surface is prevented.

It is another object of the present invention to provide a brake system which utilizes the phase relationship between the brake pressure and torque to anticipate the skidding of the wheel and avoiding such skidding.

It is yet another object of the present invention to provide a brake system which utilizes the brake torque coefficient-slip curve to prevent the skidding of a wheel.

Still another object of the present invention is to provide a secondary circuitry to override the default system to maintain the maximum performance of a brake system.

DETAILED DESCRIPTION OF THE PREFERRED EMBODIMENT

FIG. 1 shows general curves of the brake torque with respect to pressure and the ratio of incremental brake torque to incremental pressure with respect to pressure. The plot of the phase relationship between the brake pressure and the torque created by the brakes has a positive and a negative slope. On the left side of the curve, region A, the slope of the derivative of the torque with respect to pressure is positive. At the peak of the curve the slope is 0 at B. On the right side of the curve, region C, the slope is negative. By restricting the brake control to region A, skids can be completely prevented.

More specifically, it can be seen that as the brake pressure increases the torque increases creating a positive slope, in region A. When the wheel begins to skid the brake pressure continues to increase but the torque levels off creating a zero slope at B. As the skidding increases the pressure increases and the torque decreases creating a negative slope in region C. The present invention utilizes this phase relationship in order to prevent skidding of the wheel as can be seen from the plot of the incremental torque and increments pressure ratio versus the brake pressure.

Figure 2:
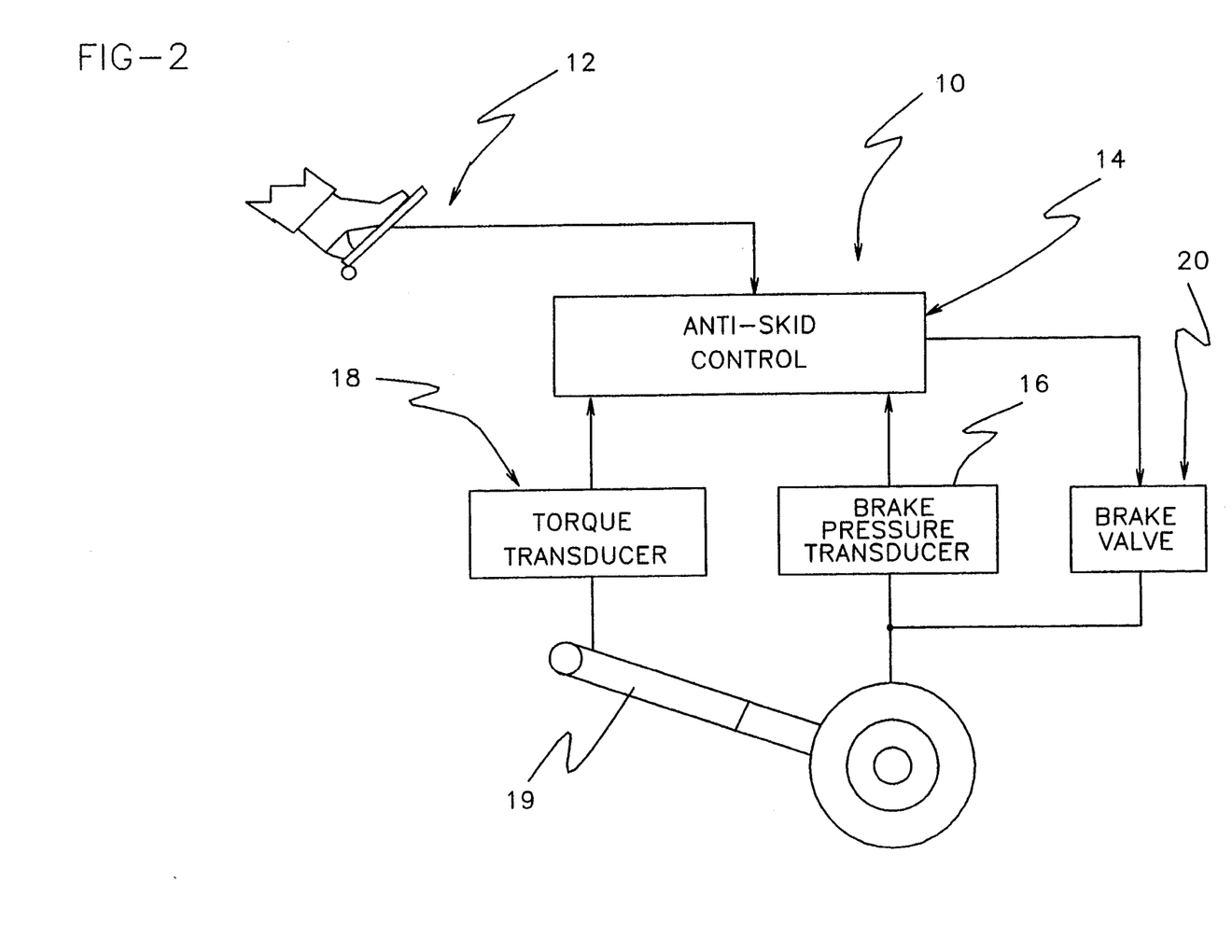
FIG. 2 is a functional block diagram of a preferred embodiment of the brake system of the present invention.

Referring to FIG. 2, when it is desired to slow a vehicle down, the operator inputs a brake command or torque command 12 into the anti-skid control braking system 10. Such command can be entered by a brake pedal into the anti-skid control system. This torque command 12 is input into an anti-skid control 14 which also receives the brake pressure measured by a brake pressure transducer 16 and the torque created by the brakes being applied from a torque transducer 18. The torque can be measured using a strain gauge 19. The anti-skid control 14 processes the input signals to determine the phase relationship between the brake pressure and the torque and the slope of such phase relationship to control and drive the brake valve 20 of the brake system.

Figure 3:
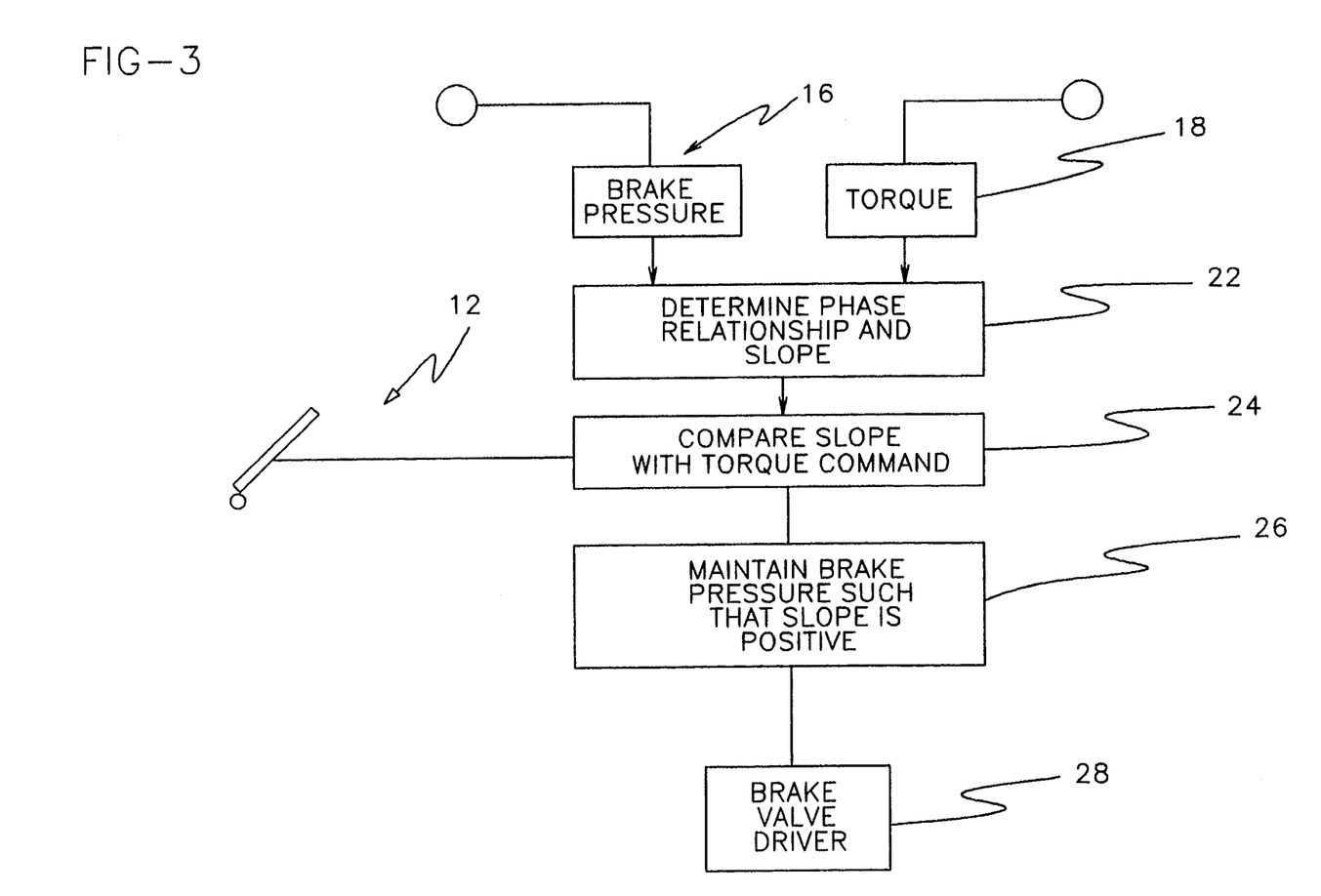
FIG. 3 is a functional block diagram of the circuitry which determines the phase relationship of the brake pressure and the torque.

In FIG. 3 the anti-skid control 14 is shown in more detail. The measured brake pressure 16 and the torque 18 signals are input into a circuit 22 that calculates the phase relationship and the slope of such phase relationship to control the brakes. This slope circuitry 22 creates a slope signal which is representative of the slope of the phase relationship of the brake pressure and torque curve of the brake system. This slope signal is input into a modifying circuit 24 which also receives the torque command 12. The modifying circuit 24 compares the measured slope signal with the torque command from the operator and determines if the slope is nearing zero or is equal to zero. If the slope does approach zero, then the circuit adjusts the torque command 26 to maintain the slope of the phase relationship positive. This adjustment produces a torque error signal. The torque error signal will modify the torque command and drive a brake drive valve 28 to control the brake of the brake system. If the slope is positive, then the circuit will not adjust the torque command from the operator.

It should be understood that the present invention is used to control a single wheel and that one control system of the present invention will be used for each wheel of the vehicle.

It should also be understood that this is a closed loop system and the brake pressure transducer 16 and the torque transducer 18 do not measure any significant values until the torque command is input into the system for driving the brake valve 20. Therefore, initially, the operator's input torque command drives the brake valve driver 28 until the brake pressure transducer 16 and torque transducer 18 reads their appropriate inputs and the slope of their phase relationship is determined. If the slope of the pressure versus torque curve approaches zero then and only then will the torque command be modified such that skidding is prevented. Therefore, under normal operations the anti-skid control circuitry of the present invention will not modify the torque command.

Furthermore, it should be understood that the system has a rapid response time to respond to the changing conditions of the surface in which the present invention's brake system is used. For example, the surface may consist of various patches of ice which continually changes the torque on the wheel. Thus, the brake pressure will constantly have to change with the changing characteristics of the surface to prevent the skidding of the wheel on the surface.

In more detail and to reiterate, when the brake is initially applied, this develops a torque command which enters the anti-skid control circuitry 14. At this point the torque transducer 18 and brake transducer 16 measures no brake pressure or torque being applied and the torque command directly drives the brake valve 20 for applying the brakes. Once the brake valve applies pressure to the brakes, the pressure transducer 18 measures this pressure and the torque transducer 16 measures the torque produced by the brakes. These signals are input into the anti-skid control circuitry 14. As stated above, the phase relationship between the brake pressure and the torque is determined by the anti-skid control 14 for determining the slope of their relationship and the anti-skid control 14 will only modify the torque command when the slope approaches zero.

Figure 4:
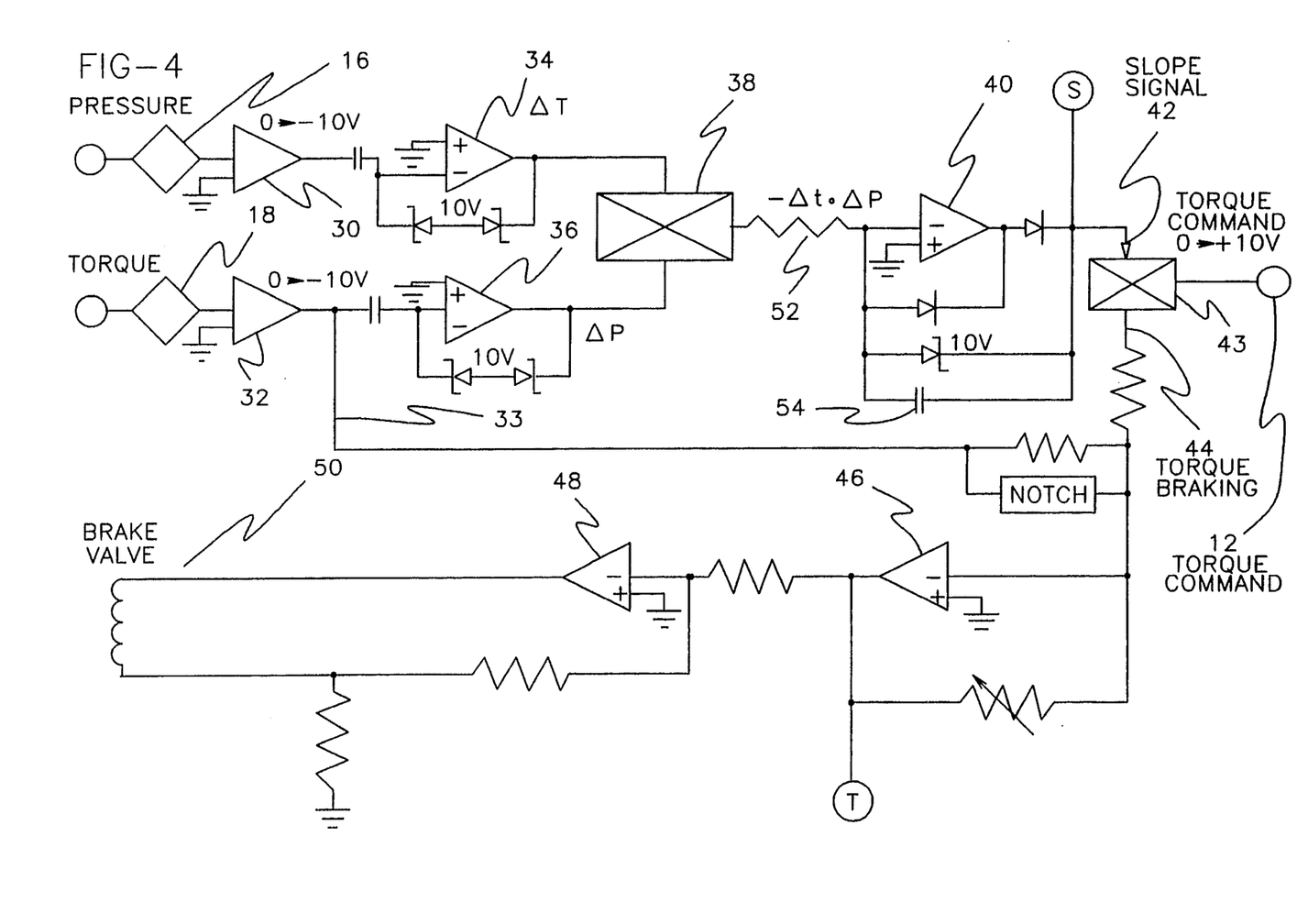
FIG. 4 is a schematic diagram of the brake pressure versus torque control system of the preferred embodiment.

More specifically, referring to FIG. 4, the circuitry of the torque command control is shown wherein the pressure transducer 16 measures the brake pressure and inputs a signal into an amplifier 30 which outputs a signal from zero to minus 10 volts, zero being no pressure and minus 10 volts being maximum pressure.

The torque transducer 18 measures the torque on the wheel created from the brake pressure applied thereto and inputs a signal into an amplifier 32. The amplifier 32 outputs a signal from zero to minus 10 volts representing the torque on the wheel, zero being no torque and minus 10 volts being maximum torque.

The amplified brake pressure signal and amplified torque signal is fed into differentiating circuits 34 and 36. Each signal is differentiated. The output of the differentiating circuits 34 and 36 is the time derivative of the torque $\Delta T$ and the time derivative of the brake pressure $\neq P$ respectively. The differentiated torque and brake pressure signals are fed into a multiplier 38 which outputs a product of the differentiated pressure and torque signals as a polarity signal. This signal is then integrated by integrating circuit 40.

This integrating circuit 40 outputs an integrated torque signal representing the slope of the phase relationship of the brake pressure and torque. This output signal ranges from 10 volts which indicates that the slope is positive to zero volts which indicates that the slope is zero. The slope signal 42 is fed into a multiplier 43 which also receives the torque command signal 12 from the operator. This torque command signal generally ranges from zero to 10 volts, zero volts being no braking and 10 volts being maximum braking. The slope signal 42 or integrated signal is multiplied with the torque command 12 which produces a torque braking signal 44. This torque braking signal represents the torque which should be applied to the braking system in order to prevent skidding. As stated above, if the brakes are operating under the normal condition where the slope is positive, then the torque command will not be modified.

Further, the measured torque response signal 33 is compared with the torque braking signal 44 and the difference input into amplifier 46, which produces a torque error signal to drive the brake valve driver 48 to control the brake valve 50 of the brake system.

The torque braking signal 44 is limited to zero or positive values because both inputs to the multiplier 43 are limited to zero or positive values. The slope signal 42 from amplifier 40 is limited to values between +10 volts and zero volts by the three diode feedback network which also maintains the voltage input to amplifier 40 at zero volts (virtual ground). If torque braking signal is zero, no pressure will be applied to the brake and the outputs of both amplifiers 30 and 32 will be zero. For this condition, the outputs of the differentiators 34 and 36 and the multiplier 38 will also be zero. Also, for this prebraking condition the output of the integrator 40 is set at a constant +10 volts output, with zero input current from multiplier 38.

When the torque braking signal 44 is applied, pressure is applied to the brake and torque will be applied to the wheel if it is rolling. Normal or induced variations will appear in torque 33 which will modulate the brake pressure through the brake valve causing outputs from amplifiers 34 and 36. These variations will appear as (−) signals from multiplier 38 if the outputs of 34 and 36 are in phase and as (+) if they are out of phase. When the output of multiplier 38 is plotted relative to brake pressure the $\Delta T/\Delta P$ versus pressure curve of FIG. 1 is obtained.

The response time set for the brake system of the present invention is determined by the value of the resistor 52 and capacitor 54 of the integrating circuit 40. Thus, for the minimum practical response time the resistor and capacitor should be set to respond as quickly as possible to the changing pressure and torque inputs from the pressure and torque transducers 16 and 18.

It should be understood that the operational amplifiers used to amplify the signals, integrate the signals, and differentiate the signals can use the standard operational amplifiers typified by an LM741. The multipliers used in the circuitry for the multiplier 38 and 43 are typically AD534 multipliers. As stated above, it can be seen that the circuitry of FIG. 4 is a closed loop system.

Figure 5:
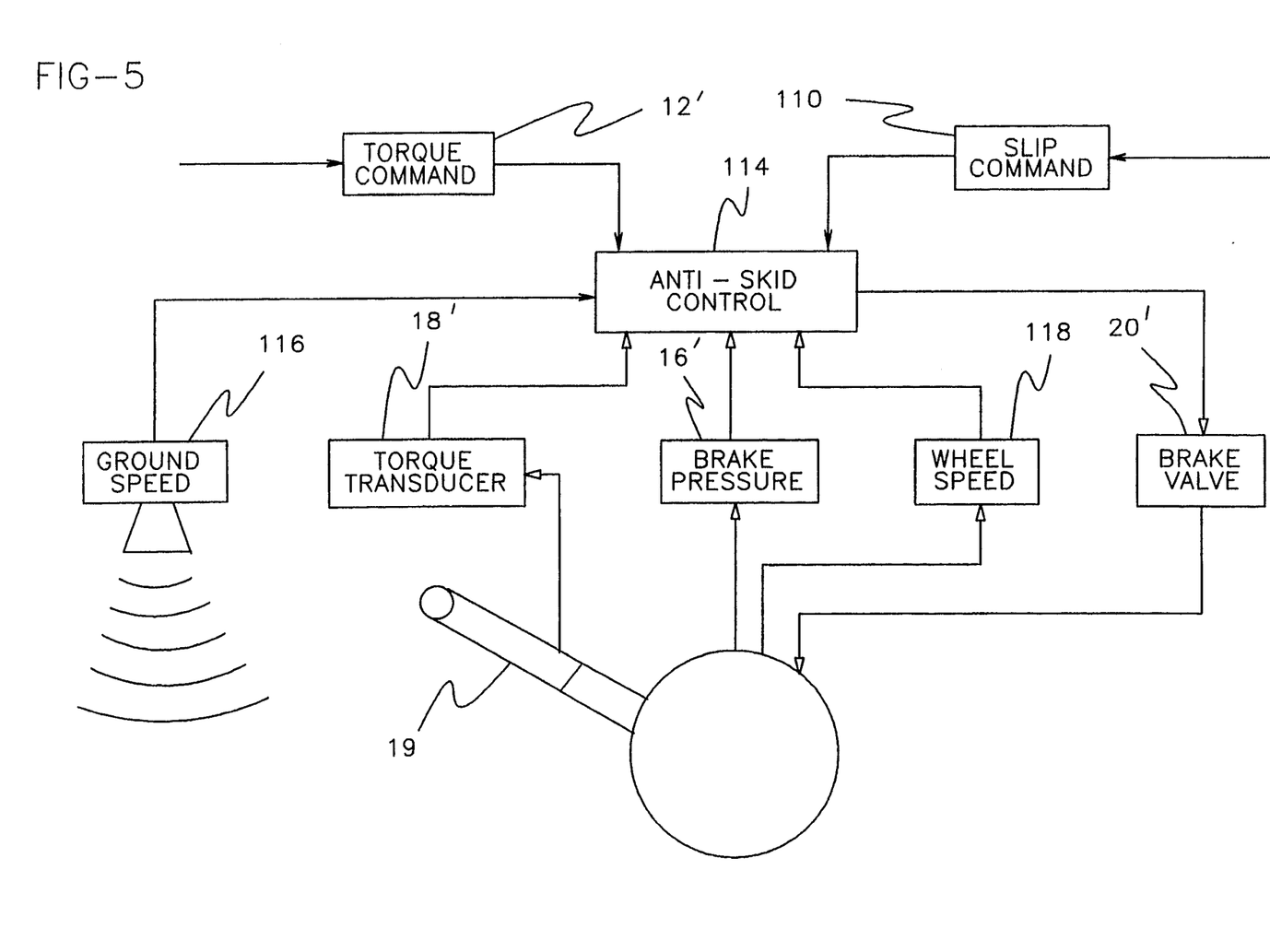
FIG. 5 is a functional block diagram of a second embodiment of the present invention.

Now referring to FIG. 5, the second embodiment will be described hereafter which utilizes the first embodiment in combination with a slip command circuit. The slip command circuit determines any slippage of the wheel on the surface. The second embodiment is a redundant system which uses the torque command system as the primary system.

The torque command 12′ is input into an anti-skid control circuitry 114 and the slip command 110, which represents the percentage of desired slip inputted by the operator, is also input into the anti-skid control circuitry 114. The desired slip can range from 0% to 100%, 0% being no skidding and 100% being a full skid with wheel lockup. The ground speed is measured and input into the anti-skid control circuitry 114. This ground speed can be measured by a doppler-type system which utilizes microwave or ultrasonic waves in order to measure the ground speed in relation to the vehicle. The wheel speed 118 is measured and input along with the brake pressure 16' and torque 18'.

The anti-skid control circuitry processes these signals and develops the torque error signal, as described above, which drives the brake valve 20' of the brake system unless the torque command system fails. If it does fail, then the percentage slip system overrides the torque command system to drive the brake valve 20' of the brake system.

Figure 6:
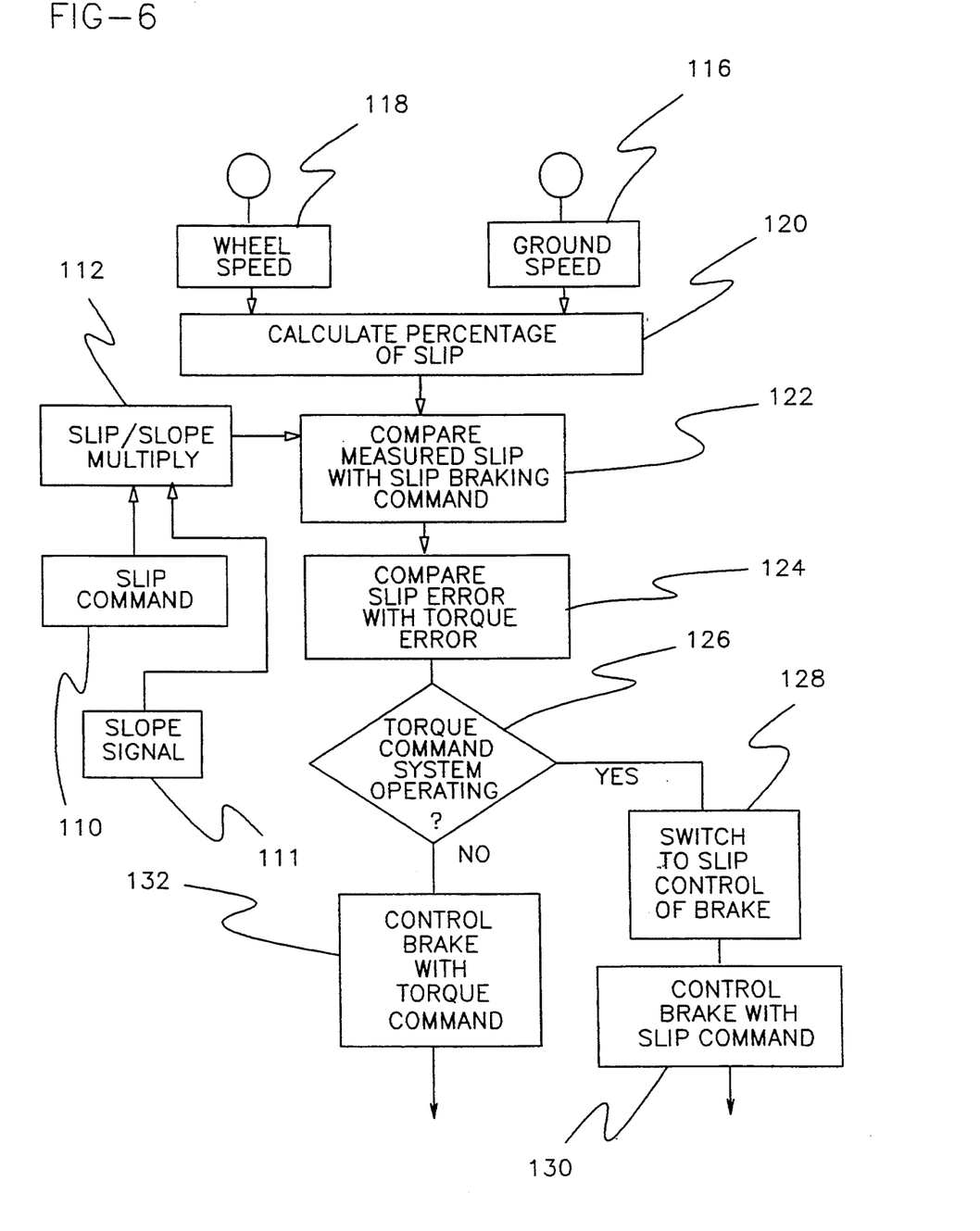
FIG. 6 is a functional block diagram of the slip control system of the brake system of the present invention.

Referring to FIG. 6 there is shown the percentage slip system of the second embodiment. The wheel speed 118 and ground speed 116 are measured and input into a percentage slip circuitry 120. The ground speed is subtracted from the wheel speed and then divided by the ground speed in order to determine the percentage of slip of the wheel on the surface. The percentage slip circuitry 120 produces a signal which is fed into comparing circuit 122. The comparing circuit 122 compares the percentage of slip command, inputted by the operator, but limited by the slope signal 111 to the actual slip 110 measured. If the actual percentage slip exceeds the percentage slip braking command entered 120, then a negative slip error signal will be produced and fed into a controlling circuit which compares the slip error signal to the torque error signal. If the torque command system fails then the control circuit switches to the percentage slip system to control the brake driver 128 which then controls the brake driver 130 of the brake valve. If the torque command system is operating, then the brake valve driver is controlled with the torque command 132.

Figure 7:
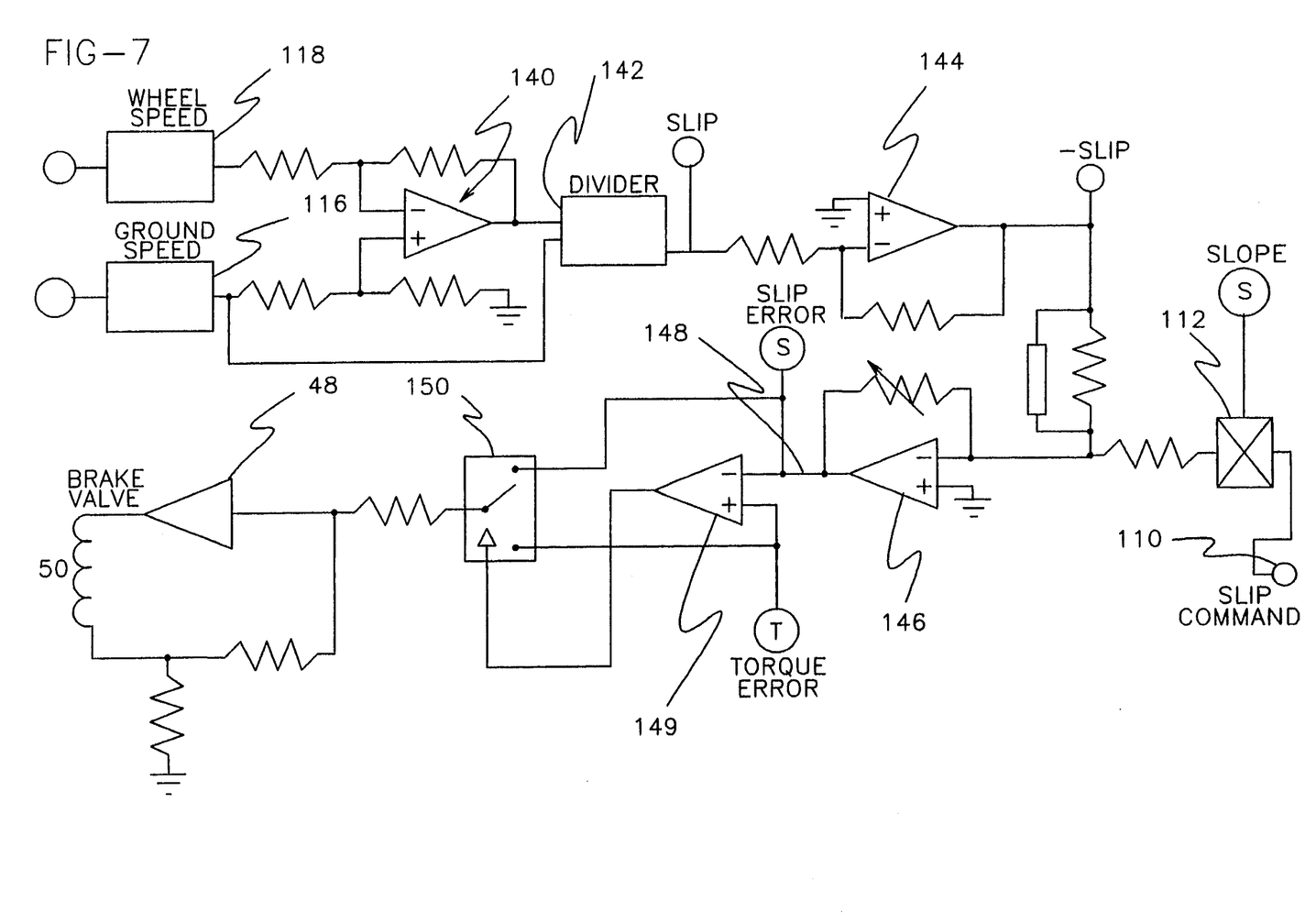
FIG. 7 is a schematic diagram of the slip control system.

Specifically referring to FIG. 7, the wheel speed 118 and ground speed 116 are input into the subtracting circuit 140 which outputs the ground speed minus the wheel speed into a divider 142 to determine the percentage of slip of the wheel compared to the ground. This percentage slip is fed into an invertor 144 which inverts the signal and outputs a negative slip response signal from zero to minus 10 volts, zero volts being no slip and minus 10 volts being 100% slip. The slip command which is zero to 10 volts, zero volts being 0% slip and 10 volts being 100% slip, is input and compared 112 to the integrated slope signal inputted S from the slope determining circuitry shown in FIG. 4. Preferably the slip command is set for 20% slip for optimum stability. The inputting and limiting of the slip command with the slope determining signal is a third redundant check to determine if the torque command system is operating properly.

The measured percentage slip response signal is compared to the slip braking signal from 112 and amplified by amplifier 146 which outputs a slip error signal on line 148. This slip error is compared to the torque error T, from the circuitry of FIG. 4, by op-amp 149 to determine which will control at the lower brake pressure. Control switches move from torque to % slip when the slip error signal becomes more positive than the torque error signal T. The error comparator 149 output switches from a nominal +15 volts to −15 volts as the slip error exceeds the torque error by a nominal ±1 millivolt. This change in the control voltage to the single-pole double-throw electronic switch 150 causes the brake valve control for valve driver 48 and the brake valve 50 to be transferred from torque error to slip error.

The speed of the electronics relative to the brake plus the small size of the voltage transfer region relative to the ranges of the error signals provide no apparent mechanical discontinuity in the transfer. This also allows the operator to have the option of selecting either torque or slip as the primary control with the secondary control acting as a limit.

Again, the amplifiers used in the percentage slip control circuit of FIG. 6 are typical operational amplifiers such as an LM741 and the divider 142 is typically an AD538 divider.

Both embodiments of the present invention provides a no-skid control system which prevents any skidding by maintaining the slope of the pressure versus torque positive. The second embodiment provides a secondary or backup system in the instance where the torque command system fails in order to minimize the skidding of the wheel on a surface. Both systems maintain the wheels such that the braking and control of the vehicle is at its optimum point.

While the method herein described, and the form of apparatus for carrying this method into effect, constitute preferred embodiments of this invention, it is to be understood that the invention is not limited to this precise method and form of apparatus, and that changes may be made in either without departing from the scope of the invention, which is defined in the appended claims.

What is claimed is:

1. A method of controlling a brake system to prevent skidding of a wheel associated with the brake system of a vehicle comprising the steps of:
   producing a brake pressure signal representing braking pressure being applied to the brakes of the braking system;
   measuring a torque developed on a wheel from the brakes being applied to the wheel and producing a brake torque signal representing said torque;
   calculating a slope of a phase relationship between said brake pressure signal and said brake torque signal; and
   controlling the braking pressure to maintain said slope of said phase relationship of said brake pressure signal and said brake torque signal positive or zero, but not negative.

2. The method according to claim 1 wherein the step of calculating a slope comprises:
   differentiating the brake pressure signal and producing a differentiated brake pressure signal;
   differentiating said brake torque signal and producing a differentiated brake torque signal;
   multiplying said differentiated brake pressure signal with said differentiated brake torque signal and producing a pressure-torque slope signal; and
   integrating said pressure-torque product signal and producing a signal representing said slope of said phase relationship between said brake pressure signal and said brake torque signal.

3. The method according to claim 1 wherein the step of controlling the braking pressure to maintain said slope of said phase relationship of said brake pressure signal and said brake torque signal positive or zero comprises:

sensing a torque command representing magnitude of an operator applied braking torque and producing a torque command signal; and modifying said torque command signal if said slope of said phase relationship of said brake pressure signal and said brake torque signal approaches zero.

4. The method according to claim 1 wherein the step of controlling the braking pressure to maintain said slope of said phase relationship between said brake pressure signal and said brake torque signal positive or zero comprises:

sensing a torque command representing magnitude of an operator applied braking torque and producing a torque command signal;

adjusting said torque command signal if said slope of said phase relationship of said brake pressure signal and said brake torque signal becomes zero; and summing said brake torque signal with said torque command to drive a brake valve that controls the braking.

5. The method according to claim 3 further comprising the steps of:

measuring a wheel speed associated with the brake system;

measuring aground speed with respect to the vehicle;

calculating a measured percentage of slid of the wheel on the ground from the wheel speed and ground speed;

sensing a desired percentage slip and producing a slip command;

subtracting the measured percentage of slip from the slip command to determine if a slip command limit is exceeded and producing a slip error signal if the slip command is exceeded by the measured percentage of slip;

producing a torque error signal related to said slope of said phase relationship when said slope approaches zero;

comparing the torque error signal with the slip error signal; and controlling the braking of the brake system by overriding the torque command signal in response to a comparison of the slip error signal and the torque error signal for limiting the skidding of the wheel.

6. A brake control for a brake of a vehicle's wheel that provides the maximum braking without skidding, comprising:

a brake pressure transducer measuring an operator applied brake pressure being applied to the brakes of the vehicle and producing a brake pressure signal representing said brake pressure;

a torque transducer measuring torque produced when said brakes are applied and producing a torque signal representing said torque;

a differentiating circuit for determining a phase relationship between said brake pressure and said torque, said differentiating circuit receiving said torque and brake pressure signals, differentiating said torque and brake pressure signals, integrating said torque and brake pressure signals and producing a slope signal representing a slope of the phase relationship between said brake pressure and said torque;

a torque command input circuit for producing a torque command signal representing an operator's desired torque for braking;

a comparator circuit for receiving said slope signal and said torque command signal and comparing said slope signal with said torque command signal and modifying said torque command signal if said slope signal indicates that said slope of the phase relationship between said brake pressure and said torque approaches zero and producing a torque error signal representing a comparison of said slope signal and said torque command signal; and a brake valve driver for receiving said torque error signal by which said torque error signal controls a brake valve for applying and releasing the brake.

7. The brake control for a brake of a vehicle's wheel of claim 6 wherein said differentiating circuit comprises:

a torque differentiating circuit for receiving said torque signal and producing a differentiated torque signal representing change in the torque of the brake;

a brake pressure differentiating circuit for receiving said brake pressure signal and producing a differentiated brake pressure signal representing change in the brake pressure of the brake;

a multiplier for receiving said differentiated torque and differentiated brake pressure signals and multiplying said differentiated torque and differentiated brake pressure signals to produce a polarity signal; and an integrating circuit for receiving said polarity signal and inverting said polarity signal and producing a slope signal representing the slope of said phase relationship of said brake pressure signal and said torque signal.

8. The brake control for a brake of a vehicle's wheel according to claim 6 wherein said comparator circuit comprises:

a multiplier for receiving said slope signal and said torque command signal, said multiplier combining said slope signal and said torque command signal and producing a torque braking signal:

a summing circuit for receiving said torque signal and said torque braking signal and producing said torque error signal.

9. The brake control for a brake of a vehicle's wheel according to claim 8 further comprising:

a torque error amplifier amplifying said torque error signal to produce an amplified torque error signal; and said brake valve driver receiving said amplified torque error signal.

10. The brake control for a brake of a vehicle's wheel of claim 6 further comprising:

a wheel speed transducer measuring a wheel speed associated with the brake and producing a wheel speed signal;

a ground speed transducer measuring a ground speed with respect to the vehicle, and producing a ground speed signal;

a measured slip circuit receiving said wheel speed signal and said ground speed signal and producing a percentage slip signal representing a percentage of measured slip of the wheel;

a slip command signal circuit for producing an operator controlled slip command signal representing a desired percentage slip of the wheel;

a slip comparator receiving said slip command signal and said percentage slip signal and producing a slip error signal representing the difference between the slip command signal and the percentage slip signal of the wheel of the vehicle; and an error logic switching circuit for receiving said slip error signal and said torque error signal and overriding said torque error signal in response to a comparison of the slip error signal and the torque error signal so that said slip error signal controls said brake valve driver.

11. The brake control for a brake of a vehicle's wheel according to claim 10 wherein said measured slip circuit comprises:
a subtracting circuit calculating a difference between the ground speed and the wheel speed and producing a wheel to ground speed signal; and
a divider circuit receiving said wheel speed and wheel to ground speed signals and producing the percentage slip signal representing the percentage of measured slip of the wheel.

12. A no-skid brake control for a brake of a vehicle's wheel of that provides the maximum braking without skidding by utilizing a phase relationship between a brake torque and a brake pressure, comprising:
a brake pressure measuring means for measuring the brake pressure being applied to the brake by an operator of the vehicle, said brake pressure measuring means producing a brake pressure signal;
a pressure differentiating means for receiving said brake pressure signal and producing a differentiated brake pressure signal representing change in the brake pressure of the brake;
a torque measuring means for measuring the torque produced from the brakes being applied to the wheel, said torque measuring means producing a torque signal;
a torque differentiating means for receiving said torque signal and producing a differentiated torque signal representing change in the torque of the brake;
a first multiplying means for receiving said differentiated torque and differentiated brake pressure signals and multiplying said differentiated torque and brake pressure signals to produce a polarity signal;
an integrating means for receiving said polarity signal and producing an integrated torque polarity signal representing a sign of the slope of a phase relationship between the torque and the brake pressure;
means for sensing a torque command signal representing a magnitude of an operator applied braking torque for braking; and
a second multiplying means for receiving said integrated torque polarity signal and said torque command signal and multiplying said integrated torque polarity signal and said torque command signal to produce a modified torque command signal if said slope of said phase relationship of said torque and brake pressure approaches zero, said modified torque command signal controlling the applying and releasing of the brake of the wheel to prevent skidding of the wheel.

13. The no-skid brake control of claim 12 further comprising:
a summing means for receiving said modified torque command signal and said torque signal and producing a torque error signal for controlling the brake by applying and releasing of the brake of the wheel to prevent the skidding of the wheel.

14. The no-skid brake control according to claim 13 further comprising:
a torque error amplifier means for amplifying said torque error signal to produce an amplified torque error signal; and
a brake valve driver receiving said amplified torque error signal so that said amplified torque error signal controls a brake valve for applying and releasing the brake of the vehicle.

15. The no-skid brake control of claim 13 further comprising;
a wheel speed measuring means for measuring a wheel speed and producing a wheel speed signal;
a ground speed measuring means for determining a ground speed with respect to the vehicle and producing a ground speed signal;
a subtracting means for determining a difference between the ground speed and the wheel speed and producing a wheel to ground speed signal;
a dividing means for receiving said wheel speed and wheel to 9round speed signals and producing a percentage slip signal representing a measured percentage slip;
a sensing means for producing a slip command signal representing an operator input desired percentage slip for braking;
a slip comparator means for receiving said percentage slip signal and said slip command signal and producing a slip error signal representing a difference between the operator input desired percentage slip and the measured percent, age slip of the wheel of the vehicle; and
error logic switching means for receiving :said slip error signal and said torque error signal, said slip error signal controlling the brake in response to a comparison of the slip error signal and the torque error signal and limiting the skidding of the wheel.

16. The no-skid brake control according to claim 15 further comprising:
an inverting means for receiving said percentage slip signal and inverting said percentage slip signal to produce an inverted percentage slip signal, said comparator means summing the inverted percentage slip signal with said slip command signal and producing a slip error signal.

17. The no-skid brake control of claim 15 wherein the comparator circuit further comprises;
a third multiplying means for receiving said integrated torque signal and said slip command signal and multiplying said slip command with said integrated torque signal to produce a modified slip command; and
means for receiving said modified slip command signal and said percentage slip signal and producing said slip error signal.

* * * * *